United States Patent
Blankenship et al.

(10) Patent No.: US 6,842,827 B2
(45) Date of Patent: Jan. 11, 2005

(54) CACHE COHERENCY ARRANGEMENT TO ENHANCE INBOUND BANDWIDTH

(75) Inventors: Robert G. Blankenship, Tacoma, WA (US); Matthew A. Lambert, Olympia, WA (US); Tony S. Rand, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 10/038,996

(22) Filed: Jan. 2, 2002

(65) Prior Publication Data

US 2003/0126376 A1 Jul. 3, 2003

(51) Int. Cl.⁷ .............................................. G06F 12/00
(52) U.S. Cl. ....................... 711/141; 711/146; 711/137; 710/39; 710/40
(58) Field of Search ................................. 711/141, 146, 711/137; 710/39, 40

(56) References Cited

U.S. PATENT DOCUMENTS

| | | |
|---|---|---|
| 5,524,235 A | 6/1996 | Larson et al. |
| 5,581,729 A | 12/1996 | Nishtala et al. |
| 5,634,068 A | 5/1997 | Nishtala et al. |
| 5,655,100 A | 8/1997 | Ebrahim et al. |
| 5,657,476 A | 8/1997 | Van Loo et al. |
| 5,684,977 A | 11/1997 | Van Loo et al. |
| 5,713,004 A | 1/1998 | Kimmel et al. |
| 5,721,935 A | 2/1998 | DeSchepper et al. |
| 5,740,454 A | 4/1998 | Kelly et al. |
| 5,796,992 A | 8/1998 | Reif et al. |
| 5,819,105 A | 10/1998 | Moriarty et al. |
| 5,905,998 A | 5/1999 | Ebrahim et al. |
| 5,966,729 A | 10/1999 | Phelps |
| 6,209,067 B1 | 3/2001 | Collins et al. |
| 6,304,945 B1 | 10/2001 | Koenen |
| 6,330,656 B1 | 12/2001 | Bealkowski et al. |
| 6,357,013 B1 | 3/2002 | Kelly et al. |
| 6,519,685 B1 | 2/2003 | Chang |
| 6,598,123 B1 | 7/2003 | Anderson et al. |
| 6,615,319 B2 | 9/2003 | Khare et al. |
| 6,622,215 B2 | 9/2003 | Khare et al. |
| 6,625,694 B2 | 9/2003 | Masri et al. |
| 6,640,289 B2 | 10/2003 | McCrory et al. |
| 6,694,409 B2 | 2/2004 | Chang |
| 6,704,845 B2 | 3/2004 | Anderson et al. |
| 6,725,337 B1 | 4/2004 | Tan et al. |
| 2002/0078304 A1 | 6/2002 | Masri et al. |
| 2002/0087765 A1 | 7/2002 | Kumar et al. |
| 2002/0087766 A1 | 7/2002 | Kumar et al. |
| 2002/0087804 A1 | 7/2002 | Khare et al. |
| 2002/0087811 A1 | 7/2002 | Khare et al. |
| 2002/0095554 A1 | 7/2002 | McCrory et al. |
| 2002/0112132 A1 | 8/2002 | Lesmanne et al. |
| 2002/0129206 A1 | 9/2002 | Khare et al. |
| 2002/0178210 A1 | 11/2002 | Khare et al. |
| 2003/0065843 A1 | 4/2003 | Jones et al. |
| 2003/0070016 A1 | 4/2003 | Jones et al. |
| 2003/0126372 A1 | 7/2003 | Rand |
| 2003/0126376 A1 | 7/2003 | Blankenship et al. |
| 2003/0131201 A1 | 7/2003 | Khare et al. |
| 2003/0131202 A1 | 7/2003 | Khare et al. |
| 2003/0135696 A1 | 7/2003 | Rankin et al. |
| 2003/0163649 A1 | 8/2003 | Kapur et al. |
| 2003/0167367 A1 | 9/2003 | Kaushik et al. |
| 2003/0177317 A1 | 9/2003 | Anderson et al. |
| 2003/0177320 A1 | 9/2003 | Sah et al. |
| 2003/0204679 A1 | 10/2003 | Blankenship |
| 2004/0003184 A1 | 1/2004 | Safranek et al. |
| 2004/0015969 A1 | 1/2004 | Chang et al. |
| 2004/0022094 A1 | 2/2004 | Radhakrishnan et al. |
| 2004/0064652 A1 | 4/2004 | Creta et al. |

*Primary Examiner*—Jack A. Lane
(74) *Attorney, Agent, or Firm*—Jeffrey B. Huter (57) ABSTRACT

A cache coherency arrangement with support for pre-fetch ownership, to enhance inbound bandwidth for single leaf and multiple leaf, input-output interfaces, with shared memory space is disclosed. Embodiments comprise ownership stealing to enhance inbound bandwidth and to prevent or attenuate starvation of transactions or of an input-output interface for transactions.

30 Claims, 7 Drawing Sheets

CACHE COHERENCY ARRANGEMENT TO ENHANCE INBOUND BANDWIDTH

FIELD OF INVENTION

The present invention is in the field of cache coherency. More particularly, the present invention provides a method, apparatus, system, and machine-readable medium for cache coherency with support for pre-fetch ownership, to enhance inbound bandwidth for single leaf and multiple leaf, input-output interfaces, with shared memory space.

BACKGROUND

Coherent transactions limit the bandwidth for transactions from a peripheral input-output (I/O) bus in processor-based systems such as desktop computers, laptop computers and servers. Processor-based systems typically have a host bus that couples a processor and main memory to ports for I/O devices. The I/O devices, such as Ethernet cards, couple to the host bus through an I/O controller or bridge via a bus such as a peripheral component interconnect (PCI) bus. The I/O bus has ordering rules that govern the order of handling of transactions so an I/O device may count on the ordering when issuing transactions. When the I/O devices may count on the ordering of transactions, I/O devices may issue transactions that would otherwise cause unpredictable results. For example, after an I/O device issues a read transaction for a memory line and subsequently issues a write transaction for the memory line, the I/O device expects the read completion to return the data prior to the new data being written. However, the host bus may be an unordered domain that does not guaranty that transactions are carried out in the order received from the PCI bus. In these situations, the I/O controller governs the order of transactions.

The I/O controller places the transactions in an ordering queue in the order received to govern the order of inbound transactions from an I/O bus, and waits to transmit the inbound transaction across the unordered interface until the ordering rules corresponding to each transaction are satisfied in the ordering queue. However, when multiple I/O devices transmit coherent transactions to the I/O controller, transactions unnecessarily wait in the ordering queue for coherent transactions with unrelated ordering requirements.

I/O devices continue to demand increasing bandwidth and unnecessary delay for transactions in an ordering queue is particularly wasteful. A conventional way to meet increasing demand for bandwidth is to increase the number of ports available for I/O devices at the I/O controller or memory controller for main system memory. The increase in ports, however, increases complexity and cost of such a memory controller and drives up overall system cost. Further, products with multiple ports may share memory space. When ports share the same memory space, I/O traffic is forwarded to an ordering queue to maintain transaction ordering as well as to avoid conflicts between accesses to shared memory space. Although bandwidth of the I/O controller may be increased, problems of unnecessary delay, complexity, and cost are compounded.

BRIEF FIGURE DESCRIPTIONS

In the accompanying drawings, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
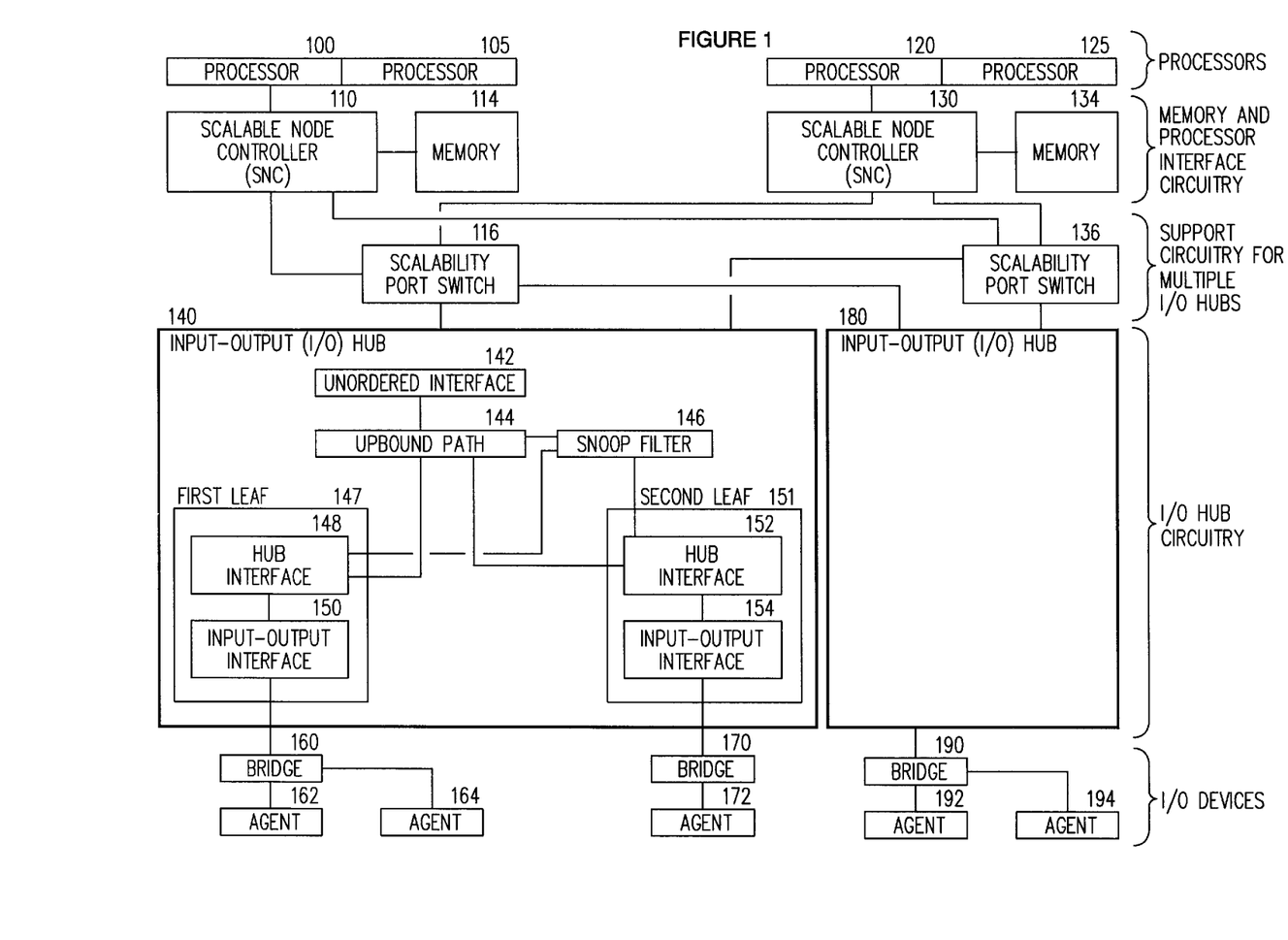
FIG. 1 depicts an embodiment of a system to transact between an ordered and an unordered interface with a processor coupled with an input-output hub.

Referring now to FIG. 1, there is shown an embodiment of a system to transact between an ordered and an unordered interface. The embodiment may comprise processors such as processors 100, 105, 120, and 125; processor interface circuitry, such as scalable node controllers 110 and 130; memory 114 and 134; input-output (I/O) hub circuitry, such as I/O hub 140 and I/O hub 180; and I/O devices, such as bridges 160, 170, and 190. In embodiments that may comprise more than one I/O hub, such as I/O hub 140 and I/O hub 180, support circuitry for multiple I/O hubs may couple the processor interface circuitry with the multiple hubs to facilitate transactions between I/O hubs 140 and 180 and processors 100, 105, 120, and 125.

Scalable node controllers 110 and 130 may couple with processors 100 and 105, and 120 and 125, respectively, to apportion tasks between processors 100, 105, 120, and 125. In some of these embodiments, scalable node controller 110 may apportion processing requests between processor 100 and processor 105, as well as between processors 100 and 105 and processors 120 and 125, for instance, based upon the type of processing request and/or the backlog of processing requests for processors 100 and 105 and processors 120 and 125.

In several embodiments, scalable node controller 110 may also coordinate access to memory 114 between processors, 100 and 105, and I/O hubs, 140 and 180. Support circuitry for multiple I/O hubs, scalability port switches 116 and 136, may direct traffic to scalable node controllers 110 and 130 based upon a backlog of transactions. In addition, scalability port switches 116 and 136 may direct transactions from scalable node controllers 110 and 130 to I/O hubs 140 and 180 based upon destination addresses for the transactions. In many embodiments, memory 114 and memory 134 may share entries, or maintain copies of the same data. In several embodiments, memory 114 and memory 134 may comprise an entry that may not be shared so a write transaction may be forwarded to either memory 114 or memory 134.

I/O hubs 140 and 180 may operate in a similar manner to bridge transactions between an ordered transactional domain and an unordered transactional domain by routing traffic between I/O devices and scalability ports. In some embodiments, I/O hubs 140 and 180 may provide peer-to-peer communication between I/O interfaces. In particular, I/O hub 140 may comprise unordered interface 142, upbound path 144, snoop filter 146, a first leaf 147 comprising hub interface 148 and input-output interface 150; and second leaf 151 comprising hub interface 152 and input-output interface 154.

Unordered interface 142 may facilitate communication between I/O hub 140 and a scalable node controller such as 110 and 130 with circuitry for a scalability port protocol layer, a scalability port link layer, and a scalability port physical layer. In some embodiments, unordered interface 142 may comprise simultaneous bi-directional signaling. Unordered interface 142 may couple to scalability port switches 116 and 136 to transmit transactions between scalability node controllers 110 and 130 and agents 162, 164, and 172. Transactions between unordered interface 142 and scalability node controllers 110 and 130 may transmit in no particular order or in an order based upon the availability of resources or ability for a target to complete a transaction. Transmission order may not be based upon, for instance, a particular transaction order according to ordering rules of an I/O interface, such as a PCI bus. For example, when agent 162 may initiate a transaction to write data to a memory line, agent 162 may transmit four packets to accomplish the write. Bridge 160 may receive the four packets in order and forward the packets in order to input-output interface 150. Hub interface 148 may maintain the order of the four packets to forward to unordered interface 142 via upbound path 144. Scalability port switch 116 may receive the packets from unordered interface 142 and transmit the packets to memory 114 and memory 134.

Upbound path 144 may comprise a path for hub interfaces 148 and 152 to issue transactions to unordered interface 142 and to snoop filter 146. For example, upbound path 144 may carry inbound coherent requests to unordered interface 142, as well as ownership requests and read cache entry invalidations from hub interfaces 148 and 152 to snoop filter 146. In many embodiments, upbound path 144 may comprise a pending transaction buffer to store a pending transaction on unordered interface 142 until a scalability port switch 116 or 136 may retrieve or may be available to receive the pending transaction.

Further, when an I/O hub such as I/O hub 140 may couple more than one I/O interface, 150 and 154, to scalability port switches 116 and 136, I/O hub 140 may comprise arbitration circuitry to grant access of upbound path 144 to transactions of first leaf 147 and second leaf 151. In many embodiments, arbitration circuitry may provide substantially equivalent access to unordered interface 142. In other embodiments, arbitration circuitry may arbitrate between first leaf 147 and second leaf 151 based upon a priority associated with, or an agent coupled with, first leaf 147 and/or second leaf 151.

Snoop filter 146 may issue ownership requests on behalf of transactions in hub interfaces 148 and 152, return ownership completions to hub interfaces 148 and 152, monitor pending transactions on unordered interface 142, and respond to downbound snoop requests from unordered interface 142 or from a peer hub interface. In addition, snoop filter 146 may perform conflict checks between snoop requests, ownership requests, and ownerships of memory lines in memory 114 or memory 134. For example, a write transaction waiting at hub interface 148 to write data to memory line one in memory 114 may reach a top of an ordering queue in hub interface 148. After the write transaction may reach the top of the queue, hub interface 148 may request ownership of memory line one for the write transaction via snoop filter 146. Snoop filter 146 may perform a conflict check with the ownership request and determine that the ownership request may conflict with the ownership of memory line one by a pending write transaction on unordered interface 142. Snoop filter 146 may respond to the ownership request by transmitting an invalidation request to hub interface 148.

Subsequently, hub interface 148 may reissue a request for ownership of memory line one for the write transaction and snoop filter 146 may perform a conflict check and determine that no conflict exists with an ownership by the write transaction. Then, snoop filter 146 may transmit a request for ownership to scalable node controller 110 via scalability port switch 116. In response, snoop filter 146 may receive an ownership completion for memory line one and may return the ownership completion to hub interface 148. In many embodiments, hub interface 148 may receive the ownership completion for a transaction and may modify the coherency state of the transaction to 'exclusive'. In several of these embodiments, snoop filter 146 may maintain the coherency state of the transaction in a buffer.

Hub interfaces 148 and 152 may operate in a similar manner, to forward transactions from I/O interfaces 150 and 154 to unordered interface 142. Hub interfaces 148 and 152 may maintain a transaction order for transactions received via I/O interfaces 150 and 154 in accordance with ordering rules associated with bridge 160 and bridge 170, respectively. Hub interfaces 148 and 152 may also determine the coherency state of transactions received via I/O interfaces 150 and 154. For example, hub interface 148 may receive a write transaction from agent 164 via bridge 160 and place the header for the write transaction in an inbound ordering queue, or, in some embodiments, an upbound ordering queue. Substantially simultaneously hub interface 148 may request ownership of the memory line associated the write transaction via snoop filter 146. Requesting ownership when the write transaction may not satisfy ordering rules associated with I/O interface 150, may be referred to as pre-fetching ownership. In alternate embodiments, when the inbound ordering queue is empty and no transactions are pending on unordered interface 142, the write transaction may bypass the ordering queue and transmit to upbound path 144 to transmit across unordered interface 142.

Snoop filter 146 may receive the request for ownership and perform a conflict check. In some instances, snoop filter 146 may determine a conflict with the ownership by the write transaction. Since the coherency state of the write transaction may be pending when received, snoop filter 146 may deny the request for ownership. After the transaction order of the write transaction may satisfy ordering rules, or in some embodiments after the write transaction reaches the top of the ordering queue, hub interface 148 may reissue a request for ownership and receive an ownership completion. In response to receiving the ownership completion for the write transaction, hub interface 148 may change the coherency state of the write transaction to 'exclusive' and then to 'modified'. In some embodiments, when the transaction may be at the top of the ordering queue upon receipt of the ownership completion, hub interface 148 may change the coherency state of the write transaction directly to 'modified', making the data of the write transaction globally visible. In several embodiments, hub interface 148 may transmit the transaction header of the write transaction to snoop filter 146 to indicate the change in the coherency state to 'modified'.

On the other hand, after hub interface 148 may receive the ownership completion in response to pre-fetching ownership, hub interface 148 may change the coherency state of the write transaction from a pending or non-ownership state to 'exclusive'. Hub interface 148 may maintain the transaction in 'exclusive' state until the write transaction may satisfy associated ordering rules or the ownership may be invalidated or stolen. For example, ordering rules governing transactions received via bridge 160 from agent 162 may be independent or substantially independent from ordering rules governing transactions received from agent 164. As a result, many embodiments allow a second transaction to steal or invalidate the ownership of the memory line by a first transaction to transmit to upbound path 144 when the ordering of the second transaction is independent or substantially independent from the ordering of the first transaction. Ownership stealing may prevent backup, starvation, deadlock, or stalling of the second transaction or the leaf comprising the second transaction as a result of the transaction order of the first transaction. In many of these embodiments, ownership may be stolen when the first transaction may reside in a different leaf from the second transaction and/or in the same leaf.

In the present embodiment, hub interface 152 may operate in a similar manner as hub interface 148, but hub interface 152 may maintain a transaction order for transactions from bridge 170 according to ordering rules independent or substantially independent from ordering rules associated with hub interface 148. As a result, the embodiment may take advantage of the unrelated transaction ordering between first leaf 147 and second leaf 151 by determining a coherency state for upbound transactions based upon a conflict and a transaction order, to take the ownership from the upbound transaction. For instance, agent 172 may initiate a write transaction to memory line one via bridge 170 and hub interface 152 may receive the write transaction. After hub interface 152 receives the write transaction, hub interface 152 may request ownership of memory line one via snoop filter 146. The write transaction may receive an ownership completion although may also be placed in the bottom of an ordering queue of hub interface 152. Agent 162 may request a read of memory line one of memory 114 and hub interface 148 may forward the read request to an ordering queue or a read bypass queue of hub interface 148 to maintain a transaction order according to an ordering rule associated with agent 162. The read transaction for memory line one may reach the top of the ordering queue of hub interface 148 and may be forwarded to snoop filter 146 to initiate a conflict check before the write transaction may satisfy ordering rule(s) associated with agent 172 or reach the top of the ordering queue of hub interface 152. In many of these embodiments, snoop filter 146 may comprise memory to store one or more read transactions or read transaction headers until the read transaction may be forwarded to unordered interface 142 and snoop filter 146 may apply back pressure to read transactions after a conflict between a read transaction received by snoop filter 146 may prevent the read transaction from being forwarded to unordered interface 142. In alternative embodiments, snoop filter 146 may perform a conflict check before the read transaction or header of the read transaction may be forwarded to snoop filter 146.

Snoop filter 146 may determine a conflict associated with the ownership of memory line one since the write transaction in hub interface 152 comprises ownership of memory line one. In response, snoop filter 146 may issue a request to invalidate the ownership by the write transaction in hub interface 152. Hub interface 152 may determine that the transaction order of the write transaction still may not satisfy the ordering rules or the write transaction may not be at the top of the queue and may accept the invalidation of ownership, stealing or taking the ownership from the write transaction. Snoop filter 146 may respond to hub interface 148 with an indication that no conflicts exist and hub interface 148 may forward the read request to upbound path 144. In alternative embodiments, after snoop filter 146 may determine a conflict and return a response to hub interface 148 indicating the conflict exists, hub interface 148 may reissue a request for the conflict check after snoop filter 146 receives an acceptance of the invalidation request from hub interface 152 for the write transaction.

In some embodiments, I/O hub 140 may comprise starvation circuitry to prevent starvation of a transaction or a leaf of transactions as a result of a determination of a coherency state for an upbound transaction based upon a conflict in the transaction order that invalidates ownership of a memory line by a transaction. For example, agent 172 may initiate a series of write transactions to memory line one of memory 114. After the first, second, and third write transactions for agent 172 are queued in an ordering queue of hub interface 152, agent 162 may initiate a fourth write transaction to memory line one of memory 114 and hub interface 148 may queue the fourth write transaction in an ordering queue of hub interface 148. Ownership of memory line one may be pre-fetched for the first transaction. Hub interface 148 may then pre-fetch ownership for memory line one for the fourth write transaction. In response, snoop filter 146 may determine that ownership by the first write transaction may prevent the fourth write transaction from gaining ownership of memory line one.

After the fourth write transaction may reach the top of the ordering queue, hub interface 148 may reissue a request for ownership of memory line one. Snoop filter 146 may determine a conflict exists for the request with the first write transaction, which may be pending on unordered interface 142, and deny the ownership request. Then, the first write transaction pending on unordered interface 142 may clear. However, arbitration circuitry of I/O hub 140 may grant access to upbound path 144 for hub interface 152 and hub interface 152 may comprise the second write transaction for memory line one which may change to a coherency state of 'modified'. Hub interface 148 may reissue a request for ownership and snoop filter 146 may determine a conflict between the second write transaction, pending on unordered interface 142. As a result, snoop filter 146 may deny the request for ownership by hub interface 148 again.

Starvation circuitry of I/O hub 140 may keep track of the number of denied requests for ownership by hub interface 148. After the number of denied requests reaches a starvation count or limit, starvation circuitry may determine to take an action to prevent starvation of the fourth write transaction or of first leaf 147. In some embodiments, the action of the starvation circuitry may stall inbound transactions to hub interfaces 148 and 152 via I/O interfaces 150 and 154, to allow transactions in hub interface 148 and hub interface 152 to complete. In many embodiments, stalling inbound transactions may flush the upbound ordering queues of hub interfaces 148 and 152. In other embodiments, starvation circuitry of I/O hub 140 may transmit a signal to arbitration circuitry of I/O hub 140 to provide a greater degree of access to upbound path 144 by hub interface 148 to prevent starvation. In one embodiment, starvation circuitry of snoop filter 146 may take more than one type of action to prevent starvation such as stalling inbound transactions to I/O interfaces 150 and 154 and/or modifying the degree of access to upbound path 144 that may be available to hub interface 148.

In the present embodiment, bridges 160, 170 and 190, couple one or more agents 162, 164, 172, 192 and 194 to I/O hubs 140 and 180 from an ordered transactional domain such as a peripheral component interconnect (PCI) bus, a universal serial bus (USB), and/or an infiniband channel. Agents 162, 164, 172, 192 and 194 may transact upbound or peer-to-peer via I/O hubs 140 and 180. In many of these embodiments, agents 162, 164, 172, 192, and 194 may transact with any processor and processors 100, 105, 120, and 125 may transact with any agent.

Figure 2:
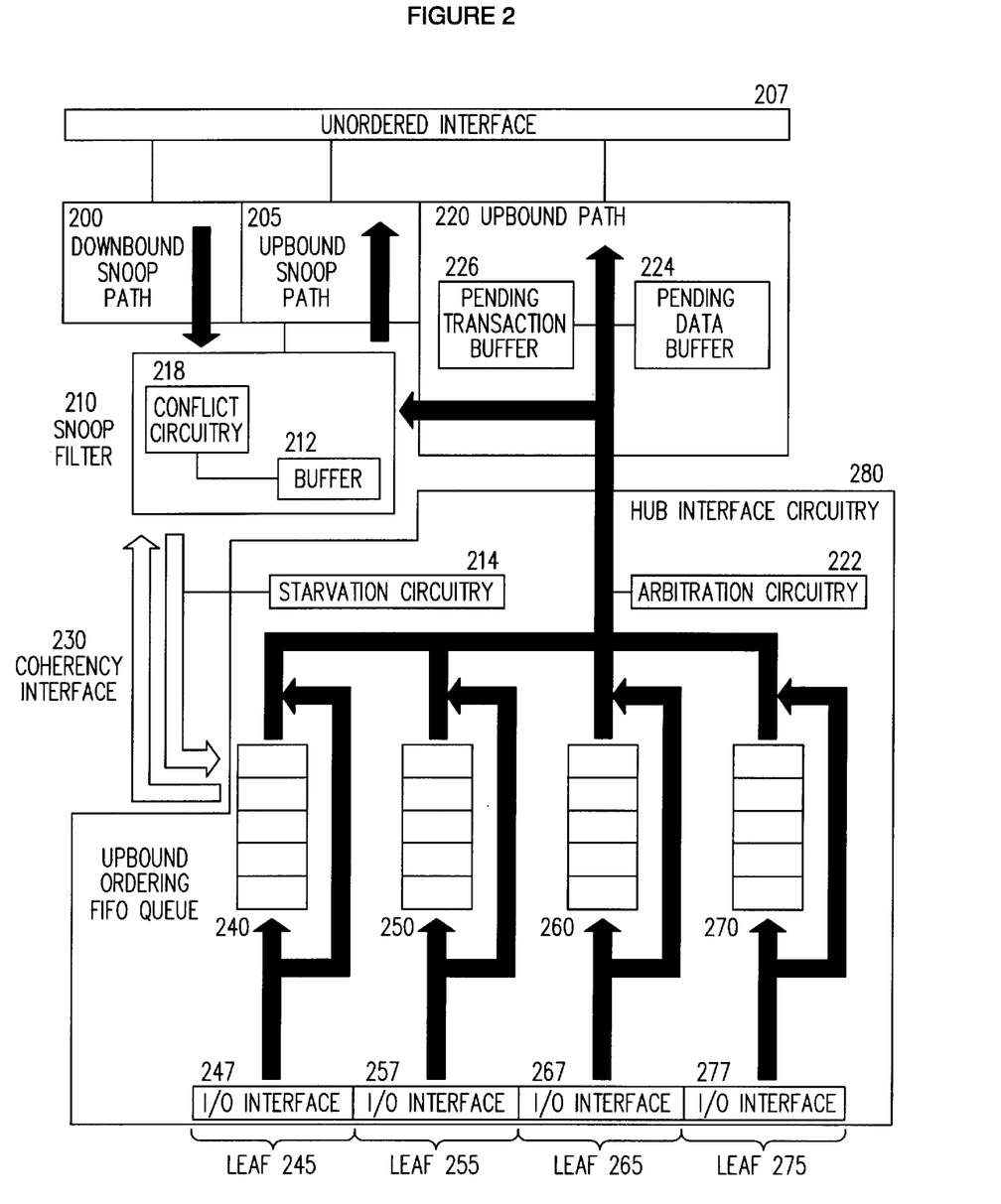
FIG. 2 depicts an embodiment of an apparatus of an input-output hub to maintain ordering for transactions.

Referring now to FIG. 2, there is shown an embodiment of an apparatus of an input-output hub to maintain ordering for transactions between an ordered transactional domain, I/O interfaces, and unordered transactional domain, unordered interface 207. The embodiment may comprise unordered interface 207, downbound snoop path 200, upbound snoop path 205, snoop filter 210, coherency interface 230, hub interface circuitry 280, and upbound path 220. Downbound snoop path 200 may comprise circuitry to transmit a snoop request from unordered interface 207 down to snoop filter 210. Upbound snoop path 205 may provide a path between snoop filter 210 and a controller on the other side of unordered interface 207 to facilitate snoop request by snoop filter 210 and/or I/O devices coupled with leaves 245, 255, 265 and 275. In some embodiments, upbound snoop path 205 may facilitate cache coherency requests. For example, a processor in the unordered transactional domain may comprise cache and snoop filter 210 may request invalidation of a cache line after a leaf such as leaf 245 may receive a write transaction for memory associated with that cache line.

Snoop filter 210 may comprise conflict circuitry 218 and buffer 212. Conflict circuitry 218 may determine conflicts between downbound snoop requests, inbound read transactions, inbound write transactions, and upbound transactions. Further, conflict circuitry 218 may comprise circuitry to respond to downbound snoop requests. Conflict circuitry 218 may couple with buffer 212 to store the coherency states and associate the coherency states with entries in upbound ordering first-in, first-out (FIFO) queues 240, 250, 260, and 270.

Buffer 212 may comprise a reverse routing field to store locations of entries in ordering queues. For example, after snoop filter 210 may receive an ownership completion across unordered interface 207, snoop filter 210 may use the reverse routing field, stored in buffer 212 when the request for ownership was issued, to forward the completion across coherency interface 230 to the target entry of an ordering queue, e.g. the entry in the upbound ordering FIFO queues 240, 250, 260, and 270 with a write transaction header that is associated with the ownership request.

Further, conflict circuitry 218 may issue an invalidation request to hub interface circuitry 280 to invalidate an 'exclusive' coherency state of a transaction in an upbound ordering FIFO queue wherein the coherency state conflicts with ownership of the memory line by another transaction. For example, snoop filter 210 may receive a downbound snoop request via downbound snoop path 200 and conflict circuitry 218 may compare the address of the memory line associated with the downbound snoop request against addresses in buffer 212. After conflict circuitry 218 may determine that a transaction in upbound ordering FIFO queue 240 may own the memory line, conflict circuitry 218 may initiate a request to invalidate the ownership, or 'exclusive' coherency state, using the reverse routing field. Conflict circuitry 218 may transmit the invalidation request via coherency interface 230. Hub interface circuitry 280 may respond to the request to invalidate via coherency interface 230, with an acceptance or rejection of the request. Conflict circuitry 218 may update a coherency state stored in buffer 212 accordingly.

Coherency interface 230 may relay internal coherency completion and invalidation requests from snoop filter 210 to hub interface circuitry 280. These coherency requests may be generated by snoop filter 210 and may be the result of an ownership completion, a downbound snoop request, or an inbound coherent transaction. In some embodiments, coherency interface 230 may couple with buffer 212 to relay coherency requests. In particular, coherency interface 230 may couple with a reverse routing field in buffer 212 that addresses a specific entry in upbound ordering FIFO queues 240, 250, 260, and 270; and a request field of buffer 212 to indicate whether a transaction with hub interface circuitry 280 may be an ownership completion or an invalidation request. For example, after snoop filter 210 receives an ownership completion across unordered interface 207, snoop filter 210 may use the routing field to forward the completion across coherency interface 230 to hub interface circuitry 280. The ownership completion may be addressed to the entry in upbound ordering FIFO queue 240, 250, 260, or 270 based upon an association stored in buffer 212.

Further, coherency interface 230 may couple with a response field in buffer 212 to indicate whether hub interface circuitry 280 may accept or reject an invalidation request. For example, hub interface circuitry 280 may receive a first transaction, request ownership for a memory line associated with the first transaction, and place the header of the first transaction in upbound ordering FIFO queue 240. After conflict circuitry 218 may determine a conflict associated with ownership of the memory line by the first transaction as a result of ownership by a second transaction in upbound ordering FIFO queue 260, snoop filter 210 may issue an invalidation request for the second transaction. Coherency interface 230 may relay the invalidation request to hub interface circuitry 280 and address the request according to the contents of the reverse routing field in buffer 212. Hub interface circuitry 280 may accept the invalidation of ownership and respond to the request with an indication of acceptance. As a result, coherency interface 230 may route the indication of acceptance to the response field.

Hub interface circuitry 280 may maintain ordering of an upbound transaction as specified by ordering rules, such as PCI ordering rules, and determine a coherency state of the upbound transaction. Hub interface circuitry 280 may comprise upbound ordering FIFO queues 240, 250, 260, and 270, to maintain a transaction order for upbound transactions according to the ordering rules and to store the coherency state and source identification (ID) for each upbound transaction. The source ID may associate an agent, or I/O device, with a transaction.

In the present embodiment, hub interface circuitry 280 may comprise four leaves, 245, 255, 265, and 275, wherein the leaves maintain transaction orders for transactions received from I/O interfaces 247, 257, 267, and 277, respectively. Further, a leaf, such as leaf 245, may maintain an ordering for transaction received from the same source agent. For example, leaf 245 may receive transactions from agent number one and transactions from agent number two. The transactions orders maintained for agent number one and agent number two may be independent unless the transactions are associated with the same memory line. As a result, transactions from agent number one may satisfy their corresponding ordering rules and be transmitted to the unordered interface without regard to transactions from agent number two sitting in an upbound ordering FIFO queue. In addition, division of the transactions into leaves may facilitate transactions of one leaf, such as leaf 255, independent of a transaction order for transactions of a second leaf, such as leaf 245, when the transactions in leaf 255 may satisfy relevant ordering rules to transmit across unordered interface 207.

Hub interface circuitry 280 may provide circuitry to determine a coherency state for an inbound transaction and respond to coherency requests issued across coherency interface 230 from snoop filter 210. For example, when snoop filter 210 may send an ownership completion, hub interface circuitry 280 may accept the completion and update the status of the targeted inbound transaction as owning the memory line, or change the coherency state of the targeted inbound transaction from a non-ownership coherency state to 'exclusive', an ownership coherency state. On the other hand, in situations where snoop filter 210 may send an invalidation request targeting an inbound write transaction that has a a non-ownership coherency state, hub interface circuitry 280 may accept the invalidation and reissue a request for ownership after the inbound write transaction may reach the top of an upbound ordering FIFO queue 240, 250, 260, or 270.

On the other hand, when snoop filter 210 may send an invalidation request targeting an inbound write transaction that owns the memory line, but the transaction is not at the top of an upbound ordering FIFO queue, or is not in flight to snoop filter 210, hub interface circuitry 280 may accept the invalidation and reissue a request for ownership after the transaction reaches the top of the corresponding upbound ordering FIFO queue 240, 250, 260, or 270. Accepting invalidation for a transaction that owns a memory line, takes away, or steals, the ownership from the transaction.

In the present embodiment, when the snoop filter 210 may send an invalidation request targeting an inbound write transaction that owns the memory line and the inbound write transaction may either be at the top of upbound ordering FIFO queue 240, 250, 260, or 270 or in flight to snoop filter 210, then hub interface circuitry 280 may reject the invalidation request and snoop filter 210 may wait for the inbound write transaction to be received. For example, when a write transaction reaches the top of an upbound ordering FIFO queue in leaf 245, the write transaction may satisfy ordering rules to transmit to unordered interface 207, so hub interface circuitry 280 may transition the write transaction to a coherency state of modified and forward an indication of the modified coherency state to snoop filter 210 via upbound path 220. However, while the indication from hub interface circuitry 280 may transmit to snoop filter 210, snoop filter 210 may issue a request for invalidation of that write transaction to hub interface circuitry 280 in response to a second transaction. In many embodiments, hub interface circuitry 280 may reject the request for invalidation once a transaction reaches the top of an upbound ordering FIFO queue 240, 250, 260, or 270, and the transaction owns a memory line. In these embodiments, the ownership of the memory line by such a transaction may not be stolen.

In some embodiments, hub interface circuitry 280 may comprise arbitration circuitry 222 and starvation circuitry 214. Arbitration circuitry 222 may arbitrate access to upbound path 220 between leaves 245, 255, 265, and 275 of hub interface circuitry 280. Starvation circuitry 214 may couple with conflict circuitry 218 and buffer 212 to prevent starvation of a transaction or a leaf of transactions. In many embodiments, starvation circuitry 214 may monitor the number of invalidations transmitted and/or accepted by hub interface circuitry 280 for a transaction or a leaf. For example, arbitration circuitry 222 may arbitrate substantially equivalent access between leaves 245, 255, 265 and 275 for transmission of transactions from an upbound ordering FIFO queue through upbound path 220 to unordered interface 207. After leaf 245 comprises a write transaction at the top of upbound ordering FIFO queue 240, hub interface circuitry 280 may request ownership of the memory line associated with the write transaction via snoop filter 210. Conflict circuitry 218 may recognize a conflict between a pending transaction in pending transaction buffer 226 and a request for ownership by the write transaction at the top of upbound ordering FIFO queue 240. In response, conflict circuitry 218 may transmit an indication via coherency interface 230 denying the request for ownership.

Subsequently, arbitration circuitry 222 may grant access to leaf 255 and leaf 265 and the pending transaction in pending transaction buffer 226 may transmit across an unordered interface 207. An inbound transaction in leaf 275 at the top of upbound ordering FIFO queue 270 may transmit to upbound path 220 and may be stored in pending transaction buffer 226. After arbitration circuitry 222 grants access to leaf 245, snoop filter 210 may again respond to the request for ownership with an invalidation since a transaction pending on unordered interface 207 may be associated with the same memory line. Starvation circuitry 214 may monitor the number of invalidations accepted by hub interface circuitry 280 for the transaction at the top of upbound ordering FIFO queue 240 and after the number of invalidations reaches a starvation number, starvation circuitry 214 may stall all or substantially all of the I/O interfaces to flush upbound ordering FIFO queues 240, 250, 260, and 270. Thus, the transactions associated with upbound ordering FIFO queue 240 may clear before additional write and/or read transactions may be received via I/O interfaces 247, 257, 267, and 277. In some embodiments, starvation circuitry 214 may couple with arbitration circuitry 222 to modify the level of access arbitrated to leaf 245 and/or stall I/O interfaces 247, 257, 267, and 277.

After a transaction reaches the top of an upbound ordering FIFO queue 240, 250, 260, or 270, the transaction may transmit to upbound path 220. Upbound path 220 may comprise pending data buffer 224 and pending transaction buffer 226. Pending data buffer 224 may receive and store data associated with upbound transaction awaiting transmission across unordered interface 207. Pending transaction buffer 226 may store a transaction header for a transaction pending on unordered interface 207. For example, after leaf 245 may receive an upbound transaction, hub interface circuitry 280 may place the header of the transaction in the corresponding upbound ordering FIFO queue and transmit the data associated with the header to pending data buffer 224. At some point, the header may be forwarded to pending transaction buffer 226 to await transmission across unordered interface 207. Then, after unordered interface may receive the transaction, the data may transmit across unordered interface 207. In several embodiments, pending data buffer 224 may comprise a separate buffer for leaves 245, 255, 265, and 275. Alternatively, pending data buffer 224 may comprise mechanisms such as pointers to associate a section of a buffer with a leaf.

Figure 3:
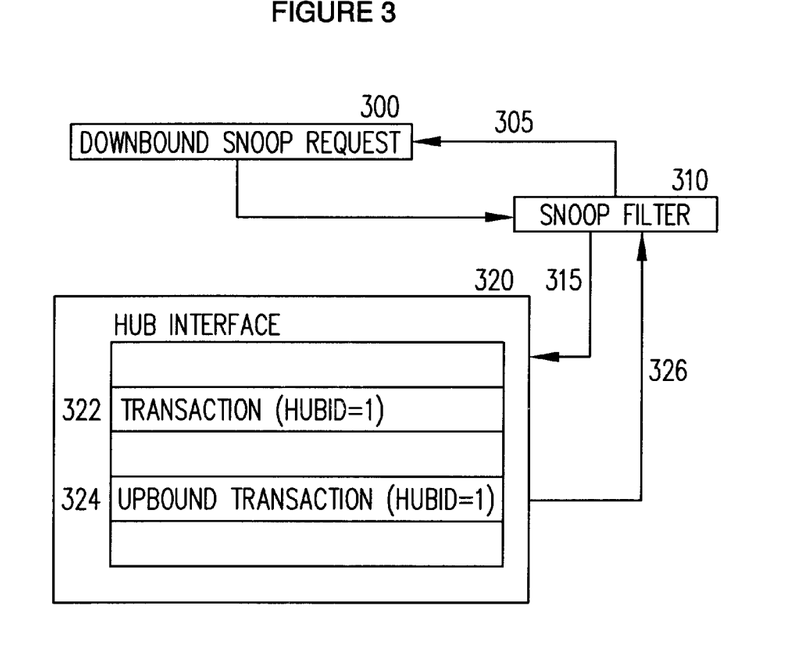
FIGS. 3–6 depict embodiments of single leaf and multiple leaf conflicts in a determination of a coherency state for an upbound transaction.

Referring now to FIG. 3, there is shown an embodiment of a single leaf conflict in a determination of a coherency state for an upbound transaction. In FIG. 3, hub interface 320 may receive a transaction 322 and transaction 322 may receive ownership of memory line one. Subsequently, hub interface 320 may receive an upbound transaction 324 and may request ownership for memory line one via snoop filter 310. Snoop filter 310 may deny the request for ownership of memory line one while transaction 322 owns memory line one. Snoop filter 310 may receive a downbound snoop request 300 for memory line one and may transmit a request 315 for invalidation of the ownership of memory line one by transaction 322. Hub interface 320 may respond to the request 326 for invalidation with an acceptance while transaction 322 may not satisfy ordering rules. As a result, snoop filter 310 may respond to downbound snoop request 305 with an invalid response to indicate that a pending write transaction may have ownership of that memory line and, in some embodiments, with the data associated with transaction 322.

Alternatively, hub interface 320 may modify the coherency state of upbound transaction 324 from a non-ownership state to 'exclusive' prior to receiving a downbound snoop request 300. As a result, after snoop filter 310 may issue a request for invalidation 315 to hub interface 320 to invalidate the ownership by upbound transaction 324, hub interface 320 may respond to the request 326 with an acceptance. Snoop filter 310 may then respond to downbound snoop request 305 with an invalidation to indicate that data of a write transaction may not be globally visible for memory line one.

Figure 4:
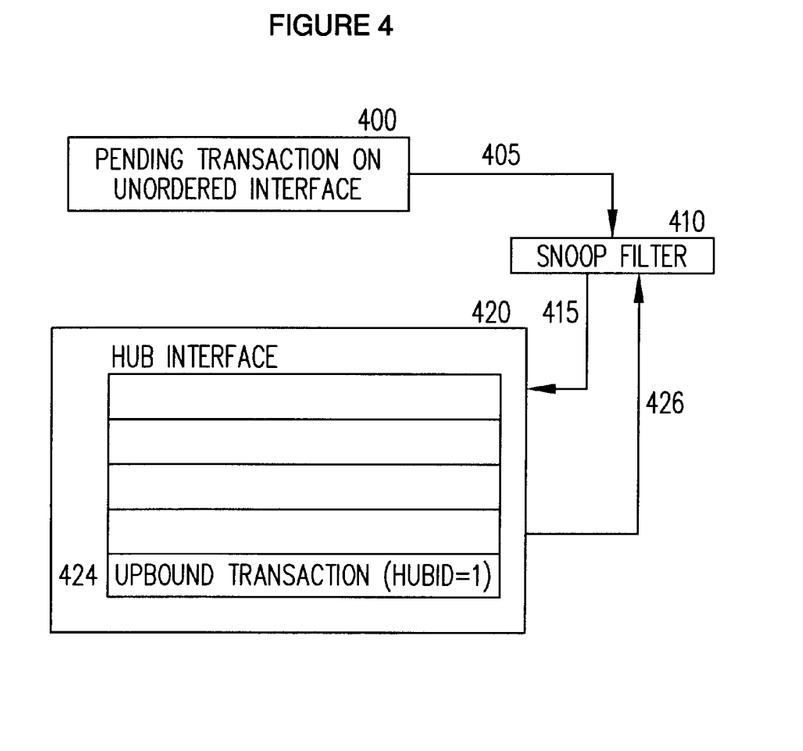

Referring now to FIG. 4, there is shown an embodiment of a single leaf conflict in a determination of a coherency state for an upbound transaction. The embodiment depicts a situation wherein hub interface 420 may receive upbound transaction 424 and may pre-fetch ownership, or request ownership 426 of a memory line, for upbound transaction 424. Snoop filter 410 may receive the request for ownership 426, perform an internal conflict check, and determine that pending transaction on unordered interface 400 conflicts with the ownership request for upbound transaction 424. Snoop filter 410 may respond 415 to the ownership request 415 with a denial, or invalidation request. After hub interface 420 may receive an invalidation request for upbound transaction 424, wherein upbound transaction 424 has a non-ownership coherency state, hub interface 420 may accept the invalidation and may reissue an ownership request for upbound transaction 424 after upbound transaction 424 may satisfy associated ordering rules.

Figure 5:
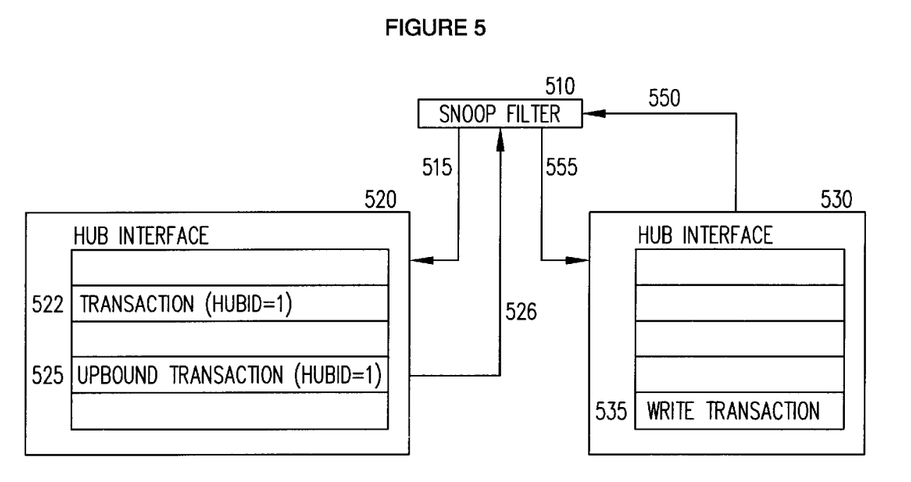

Referring now to FIG. 5, there is shown an embodiment of a multiple leaf conflict in a determination of a coherency state for an upbound transaction. The embodiment comprises a snoop filter 510, hub interface 520 representing a first leaf, and a hub interface 530 representing a second leaf. Hub interface 520 may comprise two transactions, transaction 522 with a coherency state of 'exclusive' for memory line one and upbound transaction 525 with a coherency state of 'exclusive' for memory line two. Hub interface 530 may then receive a write transaction 535 and request ownership for the memory line associated with write transaction 535, memory line two. Snoop filter 510 may perform a conflict check and determine that memory line two associated with write transaction 535 may also be associated with transaction 525 and upbound transaction 525 may have a coherency state of 'exclusive'. In response, snoop filter 510 may issue a request to invalidate the ownership 515 of the memory line by upbound transaction 525. Since upbound transaction 525 has not reached the top of an ordering queue, hub interface 520 may respond to the request 526 for invalidation of ownership with an acceptance, stealing the ownership in favor of write transaction 535. Then, snoop filter 510 may respond to the request 555 for ownership with an ownership completion. Upon receiving the ownership completion, hub interface 530 may determine the coherency state of write transaction 535, changing the coherency state to 'exclusive'.

Subsequently, upbound transaction 525 may reach the top of the corresponding ordering queue and hub interface 520 may issue a request for ownership of memory line two. Snoop filter 510 may determine a conflict between a request for ownership by upbound transaction 525 and the ownership of the memory line by write transaction 535 and may issue a request to invalidate the ownership of memory line two by write transaction 535. Hub interface 530 may respond with an acceptance wherein write transaction 535 may not satisfy associated ordering rules. Snoop filter 510 may request ownership of memory line two and, after receiving the ownership completion from the unordered interface, respond to hub interface 520 with an ownership completion. Hub interface 520 may determine the coherency state of upbound transaction 525 to change from a non-ownership state to 'exclusive' upon receipt of the ownership completion. Alternatively, when hub interface 520 may receive write transaction 535, upbound transaction 525 may satisfy ordering rules. As a result, hub interface 520 may respond to a request for invalidation from snoop filter 510 with a rejection and write transaction 535 may maintain a non-ownership coherency state until hub interface 530 may reissue a request for ownership of memory line two.

Figure 6:
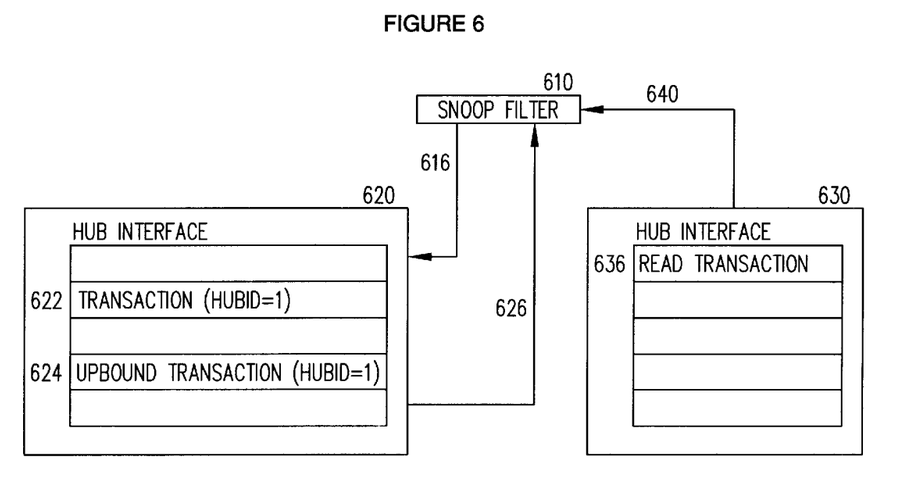

Referring now to FIG. 6, there is shown an embodiment of a multiple leaf conflict and a determination of a coherency state for an upbound transaction. The embodiment comprises a snoop filter 610, hub interface 620, and hub interface 630. Hub interface 620 may comprise two transactions, transaction 622 and upbound transaction 624. Upbound transaction 624 may not satisfy associated ordering rules until transaction 622 may transmit upbound to the unordered interface. Hub interface 630 may comprise a read transaction 636 to read the memory line associated with upbound transaction 624. Hub interface 630 may forward 640 the read transaction 636 to snoop filter 610 and snoop filter 610 may determine a conflict between read transaction 636 and the ownership of the memory line by upbound transaction 624. In response, snoop filter 610 may issue a request to invalidate the ownership 616 of the memory line by upbound transaction 624 and hub interface 620 may respond 626 with an acceptance of the invalidation since upbound transaction 624 may not satisfy associated ordering rules. Snoop filter 610 may then transmit the read transaction upbound to the unordered interface.

Alternatively, when hub interface 630 may forward 640 read transaction 636 to snoop filter 610, snoop filter 610 may determine that a conflict exists with upbound transaction 624, and snoop filter 610 may request an invalidation 616 of the ownership by upbound transaction 624. Hub interface 620 may determine that upbound transaction 624 may satisfy ordering rules and reject the request for invalidation 626 of the ownership by upbound transaction 624. Snoop filter 610 may respond applying back pressure to read transactions in and/or being accepted by hub interface 620 and hub interface 630. Snoop filter 610 may discontinue the back pressure after transactions 622, 624, and 636 are pending on the unordered interface.

Figure 7:
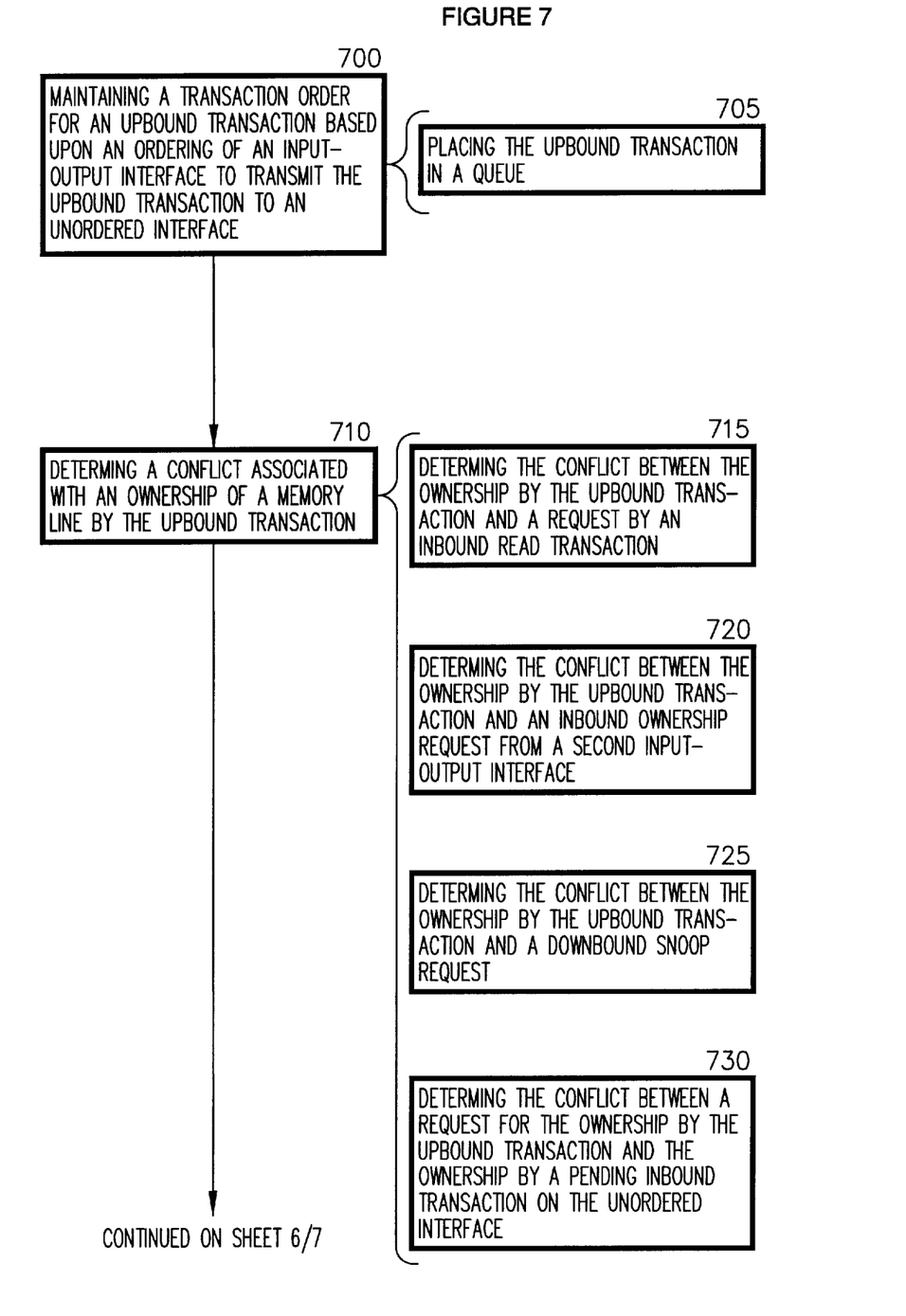
FIG. 7 depicts a flow chart of an embodiment to handle single leaf and multiple leaf conflicts.

Referring now to FIG. 7, there is shown a flow chart of an embodiment to maintain ordering for transactions and to transact between an ordered interface and an unordered interface. The embodiment comprises maintaining a transaction order for an upbound transaction based upon an ordering of an input-output interface to transmit the upbound transaction to an unordered interface 700; determining a conflict associated with an ownership of a memory line by the upbound transaction 710; determining a coherency state for the upbound transaction based upon the conflict and the transaction order, to take the ownership from the upbound transaction 740; and limiting the number of invalidations to send to the upbound transaction to prevent starvation 780. Maintaining a transaction order 700 may maintain a transaction order according to ordering rules associated with the transaction to prevent problems associated with performing transactions from an ordered interface out of order. For example, an agent on an ordered interface, such as an input-output device coupled with a bridge, may issue a series of write transactions and, assuming that the transactions will be performed in order, issue a last transaction to read the same memory contents. If the transactions are received by the unordered interface in an order other than the order they are issued, the read may return unpredictable data.

Maintaining a transaction order for an upbound transaction based upon an ordering of an input-output interface to transmit the upbound transaction to an unordered interface 700 may comprise placing the upbound transaction in a queue 705. Placing the upbound transaction in a queue 705 may allow the transactions to be transmitted to the unordered interface in the order the transactions are received from the ordered interface or the I/O interface. Maintaining the order as received from the I/O interface and allowing one transaction to issue from the queue at a time may maintain the order from the ordered interface. In some embodiments, after receiving a completion for the first transaction, the second transaction may issue to the unordered interface. In other embodiments, after the first transaction may issue, the second write transaction may issue.

Determining a conflict associated with an ownership of a memory line by the upbound transaction 710 may perform a conflict check in response to a request associated with an ownership of the memory line such as a pre-fetch of ownership for a new transaction, receipt of a read transaction or a header of a read transaction of the memory line, or a snoop request. Determining a conflict 710 may comprise determining the conflict between the ownership by the upbound transaction and a request by an inbound read transaction 715; determining the conflict between the ownership by the upbound transaction and an inbound ownership request from a second input-output interface 720; determining a conflict between the ownership by the upbound transaction and a downbound snoop request 725; and determining the conflict between a request for the ownership by the upbound transaction and the ownership by a pending inbound transaction on the unordered interface 730.

Determining the conflict between the ownership by the upbound transaction and a request by an inbound read transaction 715 may comprise performing a conflict check for a read transaction to determine whether a write may be pending for a memory line associated with the read transaction. In some embodiments, a snoop filter may perform the conflict check after the read transaction, or a header therefore, may be forwarded from the top of an ordering queue to the snoop filter.

Determining the conflict between the ownership by the upbound transaction and an inbound ownership request from a second input-output interface 720 may comprise pre-fetching ownership of the memory line by the upbound transaction and subsequently receiving an ownership request for an inbound transaction by a second hub interface. The second hub interface may attempt to pre-fetch ownership for the second transaction and a snoop filter may compare the memory line associated with the second transaction against memory contents of a buffer in the snoop filter comprising coherency states associated with memory lines of pending transactions.

Determining the conflict between the ownership by the upbound transaction and a downbound snoop request 725 may comprise determining the coherency state associated with a memory line subject to a downbound snoop request and the upbound transaction. In some embodiments, the upbound transaction may be associated with an 'exclusive' or a 'modified' coherency state, or the equivalent, or be pending on the unordered interface.

Determining the conflict between a request for the ownership by the upbound transaction and the ownership by a pending inbound transaction on the unordered interface 730 may comprise receiving a write transaction from an I/O interface, and attempting to pre-fetch ownership for the upbound transaction wherein the upbound transaction is associated with the same memory line as a pending inbound transaction on the unordered interface. The conflict check may determine whether the transactions may be associated with independent ordering rules. Embodiments may comprise a cache in a hub interface or coupled with a hub interface to respond to the subsequent anticipated read transactions rather than transmitting an anticipated read transaction upbound.

Determining a coherency state for the upbound transaction based upon the conflict in the transaction order, to take the ownership from the upbound transaction 740 may resolve the conflict by determining whether the upbound transaction may have ownership or may not. Determining a coherency state for the upbound transaction 740 may comprise applying back-pressure to subsequent read transactions from input-output devices until the conflict is cleared 745; issuing an invalidation request for the upbound transaction 750; changing the coherency state of the upbound transaction from exclusive to steal the ownership from the upbound transaction; and reissuing a request for the ownership by the upbound transaction 760. Applying back-pressure 745 may comprise slowing or stopping inbound read transactions from I/O devices to flush ordering queues. In some embodiments, applying back-pressure 745 may prevent starvation of the read transaction by a series of write transactions to the same memory line. In other embodiments, backpressure may be applied to upbound transactions.

Issuing an invalidation request for the upbound transaction 750 may issue a request to steal ownership from the upbound transaction in favor of a second transaction if the upbound transaction may not satisfy ordering rules. Issuing an invalidation request for the upbound transaction 750 may comprise rejecting an invalidation request for the upbound transaction, wherein the upbound transaction is near the top of a queue 755.

Rejecting an invalidation request for the upbound transaction, wherein the upbound transaction is near the top of a queue 755 may comprise rejecting the invalidation request and maintaining ownership of the memory line by the upbound transaction after the upbound transaction may reach or approach the top of an ordering queue. After the upbound transaction has reached or approached the top of an ordering queue, in some embodiments, the upbound transaction may satisfy associated ordering rules. For example, the snoop filter may receive a downbound snoop request for memory line one and perform a conflicts check that determines the upbound transaction owns memory line one. The snoop filter may issue a request to invalidate the ownership by the upbound transaction, but, the hub interface may reject the invalidation request when the upbound transaction is near or at the top of the ordering queue. As a result, the downbound snoop request may receive an indication that a write transaction or upbound transaction is pending for the same memory line and/or the data associated with the upbound transaction, without requesting ownership of the memory line again.

Changing the coherency state of the upbound transaction from exclusive to steal the ownership from the upbound transaction; and reissuing a request for the ownership by the upbound transaction 760 may steal or take the ownership from the upbound transaction in favor of an unrelated transaction in regards to ordering rules, to allow the unrelated transaction to transmit upbound to the unordered interface without having to wait for the upbound transaction to satisfy ordering rules. In some embodiments, changing the coherency state of the upbound transaction from exclusive 760 may comprise sending an inbound read transaction upbound 765 and issuing an invalid response to a downbound snoop request 770.

Sending an inbound read transaction upbound 765 may comprise sending an unrelated inbound read transaction upbound to the unordered interface when the upbound transaction has ownership of the memory line associated with the inbound read transaction. For example, the upbound transaction may be a write transaction to a memory line and the inbound read transaction for the same memory line may satisfy ordering rules. No conflict may exist wherein the ordering rules of the write transaction and the read transaction are unrelated or substantially unrelated. In other situations, the snoop filter may request that the hub interface invalidate the ownership of the memory line by the upbound transaction. The hub interface may accept the invalidation of the ownership; stealing the ownership from the upbound transaction in favor of the inbound read transaction. As a result, the inbound read transaction may transmit upbound and the upbound transaction may regain ownership by reissuing a request for the ownership.

Issuing an invalid response to a downbound snoop request 770 may comprise responding to a downbound snoop request with an indication that a transaction with ownership of the memory line may be pending, may not be globally visible, or may not exist. For example, a hub interface may pre-fetch ownership of a memory line for an upbound transaction via the snoop filter. The snoop filter may receive a response from the unordered interface comprising an ownership completion and forward the ownership completion to the hub interface. After receiving the ownership completion, the hub interface may modify the coherency state of the upbound transaction from a pending state to 'exclusive'. Subsequently, a peer hub interface, or a second hub interface, may transmit a snoop request to the snoop filter for the same memory line. The snoop filter, in response, may request to invalidate the ownership by the upbound transaction and when the upbound transaction may not satisfy an ordering rule, the hub interface associated with the upbound transaction may steal the ownership from the upbound transaction and respond to the snoop filter with an acceptance. The snoop filter may then respond to the downbound snoop request via the second or peer hub interface to indicate that the upbound transaction is not visible.

Limiting a number of invalidations to send to the upbound transaction to prevent starvation 780 may monitor the number of times an invalidation request is sent to a transaction and/or the number of times a hub interface responds to a request to invalidate with an acceptance. Limiting a number of invalidations 780 may monitor starvation of a leaf, starvation of a type of transaction, and/or starvation of the upbound transaction. Limiting a number of invalidations 780 may comprise stalling the input-output interface to transmit the upbound transaction to the unordered interface 785. Stalling the input-output interface 785 may comprise stalling one or more types of transactions from crossing the input-output interface into a hub interface. In some embodiments, stalling the input-output interface 785 may comprise stalling more than one input-output interface to flush the transactions in the hub interfaces. In other embodiments, stalling the input-output interface 785 may comprise stalling one or more input-output interfaces until the upbound transaction may transmit upbound to the unordered interface or stalling until the upbound transaction may transmit across the unordered interface.

Figure 8:
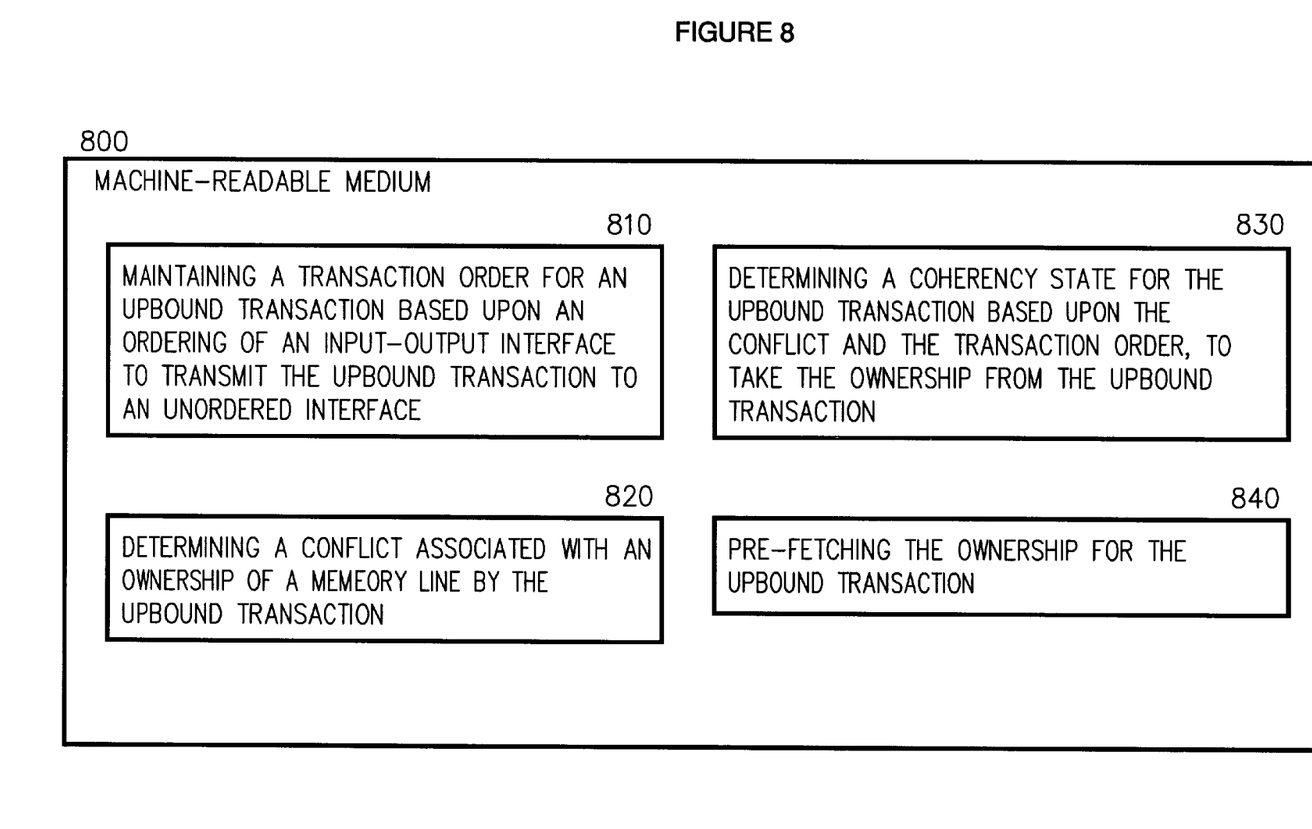
FIG. 8 depicts an embodiment of a machine-readable medium comprising instructions to handle single leaf and multiple leaf conflicts.

Referring now to FIG. 8, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 8 shows an embodiment of a machine-readable medium 800 comprising instructions for maintaining a transaction order for an upbound transaction based upon an ordering of an input-output interface to transmit the upbound transaction to an unordered interface 810; determining a conflict associated with an ownership of a memory line by the upbound transaction 820; determining a coherency state for the upbound transaction based upon the conflict and the transaction order, to take the ownership from the upbound transaction 830; and pre-fetching the ownership for the upbound transaction 840. Maintaining a transaction order 810 may comprise instructions for maintaining an upbound transaction in an upbound transaction ordering queue until the upbound transaction may satisfy ordering rules associated with the corresponding input-output interface. In some embodiments, instructions for maintaining a transaction order for an upbound transaction based upon an ordering of an input-output interface to transmit the upbound transaction to an unordered interface 810 may comprise instructions for maintaining related transactions in an order received from an input-output interface and allowing subsequent, unrelated transactions to bypass when the subsequent, unrelated transaction may satisfy the ordering of the input-output interface.

Determining a conflict associated with an ownership of a memory line by the upbound transaction 820 may comprise instructions for comparing the memory line with a memory line of another transaction and determining that an ownership of the memory line by the upbound transaction conflicts. For example, determining a conflict associated with an ownership 820 may comprise instructions for comparing a request for ownership by the upbound transaction against a coherency state associated with the memory line subject to the upbound transaction, or instructions for comparing a conflict check of a memory line or an ownership request for a memory line against the coherency state of the upbound transaction.

Determining a coherency state for the upbound transaction based upon the conflict and the transaction order, to take the ownership from the upbound transaction 830 may comprise instructions for accepting an ownership completion and updating the coherency state of the targeted write transaction from pending to owned, or exclusive. In addition, determining a coherency state 830 may comprise instructions for stealing the ownership from the upbound transaction when the upbound transaction owns the memory line but the upbound transaction is not at the top of the upbound ordering queue, nor in flight from the upbound ordering queue to the snoop filter, or may not satisfy corresponding ordering rules for the upbound transaction. On the other hand, the instructions may comprise rejecting the invalidation request when the upbound transaction owns the line, or has a coherency state of 'exclusive', or when the upbound transaction is at the top of the upbound ordering queue or in flight to the snoop filter.

Pre-fetching the ownership for the upbound transaction 840 may comprise instructions for issuing the request for ownership of a memory line associated with the upbound transaction when the upbound transaction may be received by a hub interface via the input-output interface. Pre-fetching the ownership for the upbound transaction 840 may further comprise instructions for accepting an invalidation of the request for ownership from the snoop filter. In alternative embodiments, pre-fetching the ownership for the upbound transaction 840 may comprise instructions for pre-fetching the ownership for the upbound transaction after the hub interface may receive the upbound transaction.

What is claimed is:

1. An apparatus, comprising:
    a snoop filter to determine a conflict associated with an ownership of a memory line;
    a hub interface coupled with said snoop filter to maintain a transaction order for an upbound transaction associated with the ownership, from an input-output interface, and to determine a coherency state for the upbound transaction based upon the conflict and the transaction order, to take the ownership from the upbound transaction; and
    an upbound path coupled with said hub interface to transmit the upbound transaction to an unordered interface.

2. The apparatus of claim 1, further comprising a coherency interface coupled with said snoop filter to transmit a coherency request to said hub interface.

3. The apparatus of claim 1, wherein said snoop filter comprises conflict circuitry coupled with said upbound path to determine the conflict between the ownership by the upbound transaction and a downbound snoop request.

4. The apparatus of claim 1, wherein said snoop filter comprises conflict circuitry coupled with said hub interface to determine the conflict between the ownership by the upbound transaction and a request associated with an inbound transaction.

5. The apparatus of claim 1, wherein said snoop filter comprises conflict circuitry coupled with said upbound path to determine the conflict between a request for the ownership by the upbound transaction and the ownership by a pending upbound transaction on the unordered interface.

6. The apparatus of claim 1, wherein said hub interface comprises an upbound ordering queue to store a transaction header of the upbound transaction and to maintain the transaction order.

7. The apparatus of claim 1, wherein said hub interface comprises a coherency circuit coupled with said snoop filter to determine a coherency state for the upbound transaction.

8. The apparatus of claim 7, wherein the coherency circuit comprises circuitry coupled with said snoop filter to invalidate the coherency state of exclusive ownership of a memory line by the upbound transaction.

9. The apparatus of claim 1, wherein said hub interface comprises a starvation prevention circuit to limit a number of invalidations to send to the upbound transaction.

10. The apparatus of claim 1, wherein said upbound path comprises a pending transaction buffer to store a pending, upbound transaction on the unordered interface.

11. A method, comprising:
    maintaining a transaction order for an upbound transaction based upon an ordering of an input-output interface to transmit the upbound transaction to an unordered interface;
    determining a conflict associated with an ownership of a memory line by the upbound transaction; and
    determining a coherency state for the upbound transaction based upon the conflict and the transaction order, to take the ownership from the upbound transaction.

12. The method of claim 11, further comprising limiting a number of invalidations to send to the upbound transaction to prevent starvation.

13. The method of claim 12, wherein limiting comprises stalling the input-output interface to transmit the upbound transaction to the unordered interface.

14. The method of claim 11, wherein said maintaining comprises placing the upbound transaction in a queue.

15. The method of claim 11, wherein said determining a conflict comprises determining the conflict between the ownership by the upbound transaction and a request by an inbound read transaction.

16. The method of claim 11, wherein said determining a conflict comprises determining the conflict between the ownership by the upbound transaction and an inbound ownership request from a second input-output interface.

17. The method of claim 11, wherein said determining a conflict comprises determining the conflict between the ownership by the upbound transaction and a downbound snoop request.

18. The method of claim 11, wherein said determining a conflict comprises determining the conflict between a request for the ownership by the upbound transaction and the ownership by a pending inbound transaction on the unordered interface.

19. The method of claim 11, wherein said determining a coherency state comprises applying back-pressure to subsequent read transactions from input-output devices until the conflict is cleared.

20. The method of claim 11, wherein said determining a coherency state comprises issuing an invalidation request for the upbound transaction.

21. The method of claim 20, wherein said determining a coherency state further comprises rejecting an invalidation request for the upbound transaction, wherein the upbound transaction is near the top of a queue.

22. The method of claim 11, wherein said determining a coherency state comprises:
    changing the coherency state of the upbound transaction from exclusive to steal the ownership from the upbound transaction; and
    reissuing a request for the ownership by the upbound transaction.

23. The method of claim 22, wherein said determining a coherency state further comprises sending an inbound read transaction upbound.

24. The method of claim 22, wherein said determining a coherency state further comprises issuing an invalid response to a downbound snoop request.

25. A system, comprising:

a snoop filter to determine a conflict associated with an ownership of a memory line;

a hub interface coupled with said snoop filter to maintain a transaction order for an upbound transaction associated with the ownership, from an input-output interface, and to determine a coherency state for the upbound transaction based upon the conflict and the transaction order, to take the ownership from the upbound transaction;

an upbound path coupled with said hub interface to transmit the upbound transaction to an unordered interface;

a memory circuit coupled with said upbound path to store data on a memory line associated with the upbound transaction; and a input-output device coupled with said hub interface to transmit the upbound transaction to access said memory circuit.

26. The system of claim 25, further comprising a scalability port switch coupled with the unordered interface to direct a transaction from a second input-output hub.

27. The system of claim 25, wherein said input-output device comprises a bridge coupled with said hub interface to couple more than one input-output device with said hub interface.

28. A machine-readable medium containing instructions, which when executed by a machine, cause said machine to perform operations, comprising:

maintaining a transaction order for an upbound transaction based upon an ordering of an input-output interface to transmit the upbound transaction to an unordered interface;

determining a conflict associated with an ownership of a memory line by the upbound transaction; and determining a coherency state for the upbound transaction based upon the conflict and the transaction order, to take the ownership from the upbound transaction.

29. The machine-readable medium of claim 28, further comprising pre-fetching the ownership for the upbound transaction.

30. The machine-readable medium of claim 28, wherein said determining a coherency state comprises:

changing the coherency state of the upbound transaction from exclusive to steal the ownership from the upbound transaction; and reissuing a request for the ownership by the upbound transaction.

* * * * *